(12) United States Patent
Koyama

(10) Patent No.: US 7,835,638 B2
(45) Date of Patent: Nov. 16, 2010

(54) IMAGE RECORDING APPARATUS, IMAGE RECORDING METHOD, AND COMPUTER-READABLE RECORDING MEDIUM

(75) Inventor: Kenji Koyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 883 days.

(21) Appl. No.: 11/684,121

(22) Filed: Mar. 9, 2007

(65) Prior Publication Data
US 2007/0212053 A1 Sep. 13, 2007

(30) Foreign Application Priority Data
Mar. 13, 2006 (JP) .............................. 2006-067985

(51) Int. Cl.
G03B 15/03 (2006.01)
G06K 9/00 (2006.01)

(52) U.S. Cl. ...................... 396/157; 396/164; 396/178; 382/106

(58) Field of Classification Search .................. 396/178
See application file for complete search history.

(56) References Cited

U.S. PATENT DOCUMENTS

| 6,377,753 | B1* | 4/2002 | Matsumoto | 396/96 |
| 2005/0053263 | A1* | 3/2005 | Sato | 382/106 |
| 2006/0006844 | A1 | 1/2006 | Koyama | 320/166 |
| 2007/0206938 | A1* | 9/2007 | Tanaka | 396/106 |

FOREIGN PATENT DOCUMENTS

JP  2002-311481  10/2002

* cited by examiner

*Primary Examiner*—Melissa J Koval
(74) *Attorney, Agent, or Firm*—Oblon, Spivak, McClelland, Maier & Neustadt, L.L.P.

(57) ABSTRACT

An image recording apparatus includes an image sensing part for converting an optical image imaged by a photograph lens to an electric signal, a distance measuring part for measuring a distance between a target object and the image recording apparatus, an illumination part for generating an illumination light and a pre-illumination light, a first illumination controlling part for controlling the amount of the illumination light of the illumination part based on the measured distance of the distance measuring part and a F number of the photograph lens, a second illumination controlling part for controlling the amount of the illumination light of the illumination part based on the electric signal output from the image sensing part in correspondence with the pre-illumination light, and a selecting part for selecting one of the first illumination controlling part and the second illumination controlling part.

9 Claims, 11 Drawing Sheets

VERTICAL AXIS: SIZE OF LIGHT RECEPTION DATA

HORIZONTAL AXIS: POSITION OF LIGHT RECEIVING DEVICE IN LIGHT RECEIVING AREA

VERTICAL AXIS: SIZE OF LIGHT RECEPTION DATA

HORIZONTAL AXIS: POSITION OF LIGHT RECEIVING DEVICE IN LIGHT RECEIVING AREA

IMAGE RECORDING APPARATUS, IMAGE RECORDING METHOD, AND COMPUTER-READABLE RECORDING MEDIUM

BACKGROUND OF THE INVENTION

1. Field of the Invention

The present invention relates to an image recording apparatus, an image recording method, and a computer-readable recording medium, and more particularly to an image recording apparatus, an image recording method, and a computer-readable recording medium for controlling illumination amount when photographing with illumination.

2. Description of the Related Art

A flash illumination apparatus using a discharge tube (hereinafter also referred to as "strobe") is commonly used as an illumination apparatus for a still camera. Such illumination apparatus operates by raising battery voltage and accumulating charge in a condenser having a relatively large capacity and instantly discharging the charge from a discharge tube having xenon sealed therein. Such illumination apparatus is widely used in still cameras from high class still cameras to popular still cameras owing to the fact that the illumination camera is i) suitable for recording still images by emitting a large amount of light and illuminating for an extremely short time (e.g., 1 ms), ii) illumination amount can be controlled with a relatively simple structured circuit owing to development of semiconductor switching devices, and iii) the illumination apparatus can be fabricated with a small size. In order to realize a suitable exposure with the strobe, it is necessary to control the illumination amount of the strobe. As one example of controlling the illumination amount, there is a flashmatic method. In the flashmatic method, the illumination amount necessary for realizing suitable exposure is expressed by the value of a guide number (GNo.) which is obtained by the following formula.

$$GNo. = F \times L$$

wherein "F" indicates an F number of the photograph lens and "L" indicates the distance to the photograph target (in a case where the ISO sensitivity (ISO speed) of the film or the ISO equivalent sensitivity of the imaging device is 100).

As another example of controlling the illumination amount, there is an auto-strobe method. In the auto-strobe method, the light reflected from a target object in response to light emitted from the strobe is measured by using a photometric sensor mounted on a camera body or provided in a strobe mountable on a camera, to thereby stop illumination of the strobe when the value (measured value) output from the photometric sensor becomes a predetermined value (i.e. when reaching a suitable exposure state).

As another example of controlling the illumination amount, there is a TTL direct metering method. In the TTL direct metering method, the light reflected from a target object in response to light emitted from the strobe and reflected from a film surface via a photograph lens is measured by using a photometric sensor (light measuring sensor) mounted on a main body of a camera, to thereby stop illumination of the strobe when the value (measured value) output from the photometric sensor becomes a predetermined value (i.e. when becoming suitable exposure state).

As another example of controlling the illumination amount, there is a pre-illumination method. In the pre-illumination method, when a release switch is activated, a small amount of light is emitted from the strobe prior to a main photographing process (pre-illumination) for allowing a photometric sensor (or an imaging device in a case where the image device performs photoelectric conversion) mounted to a main body of a camera to measure the light reflected from a target object in response to the pre-illumination light. Accordingly, the illumination amount of the strobe for the main photographing process is determined based on the measurement results.

As another example of controlling the illumination amount, there is a method of determining the illumination amount of the strobe based on the distance obtained by calculating the distance to the target object according to the amount in which the focus lens veers out (See, for example, Japanese Laid-Open Patent Application No. 2002-311481).

However, the above-described auto-strobe method or the TTL direct metering method requires a photometric sensor and a photometric circuit that are dedicated for these methods. Such requirement increases the size and cost of the illumination apparatus. Furthermore, the TTL direct metering method cannot be applied to a digital still camera using an imaging device since this method measures the light reflected from a film. Accordingly, it can be said that a method suitable for a digital still camera using an imaging device is the flashmatic method or the pre-illumination method.

One characteristic of the flashmatic method is that photographs can be taken as they appear (white target objects as white, black target objects as black) since the light is emitted in the amount obtained by the above-described formula regardless of the reflectivity of the target object (whether the target object is black or white). On the other hand, in a case where the target object is overall whitish or overall blackish, overexposure or underexposure may occur. Since the measurement error of a distance measurement part serves as the error of the illumination amount, there is a high probability of overexposure or underexposure (including reflectivity of the target object) in a case where the target object having depth is photographed at a close distance.

Meanwhile, in using the pre-illumination method, relatively satisfactory exposure precision can be attained since the illumination amount required for the main photographing process is determined based on the results of measuring the light reflected from the target object in response to the strobe light emitted prior to the main photographing process. Nevertheless, there is a large time lag between activation of the release switch and execution of the main photographing process since the pre-illumination and the calculation of the measured light are performed between the activation of the release switch and execution of the main photographing process. Furthermore, in a case where the illumination apparatus is a strobe type illumination apparatus, the illumination amount of the main photographing process is reduced due to the consumption of charge of the condenser during the pre-illumination process. Thus, the photographing range for long distance becomes smaller.

SUMMARY OF THE INVENTION

The present invention may provide an image recording apparatus, an image recording method, and a computer-readable recording medium that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image recording apparatus, an image recording method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image recording apparatus including: an image sensing part for converting an optical image imaged by a photograph lens to an electric signal; a distance measuring part for measuring a distance between a target object and the image recording apparatus; an illumination part for generating an illumination light and a pre-illumination light; a first illumination controlling part for controlling the amount of the illumination light of the illumination part based on the measured distance of the distance measuring part and a F number of the photograph lens; a second illumination controlling part for controlling the amount of the illumination light of the illumination part based on the electric signal output from the image sensing part in correspondence with the pre-illumination light; and a selecting part for selecting one of the first illumination controlling part and the second illumination controlling part.

Furthermore, another embodiment of the present invention provides an image recording method including the steps of: a) converting an optical image imaged by a photograph lens to an electric signal; b) measuring a distance between a target object and an image recording apparatus; c) generating an illumination light and a pre-illumination light; d) controlling the amount of the illumination light based on the distance measured in step b) and a F number of the photograph lens; e) controlling the amount of the illumination light based on the electric signal output in step a) in correspondence with the pre-illumination light; and f) selecting one of step d) and step e).

Furthermore, another embodiment of the present invention provides a computer-readable recording medium on which a program for causing a computer to execute an image recording method is recorded, the image recording method including the steps of: a) converting an optical image imaged by a photograph lens to an electric signal; b) measuring a distance between a target object and an image recording apparatus; c) generating an illumination light and a pre-illumination light; d) controlling the amount of the illumination light based on the distance measured in step b) and a F number of the photograph lens; e) controlling the amount of the illumination light based on the electric signal output in step a) in correspondence with the pre-illumination light; and f) selecting one of step d) and step e).

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1A:
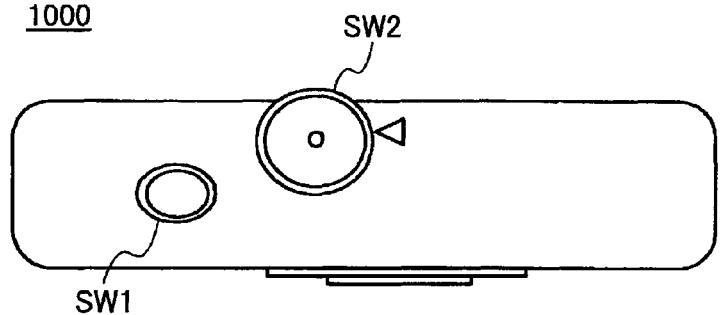
FIGS. 1A-1C are schematic diagrams showing a digital camera (image recording apparatus) according to an embodiment of the present invention.
Figure 1B:
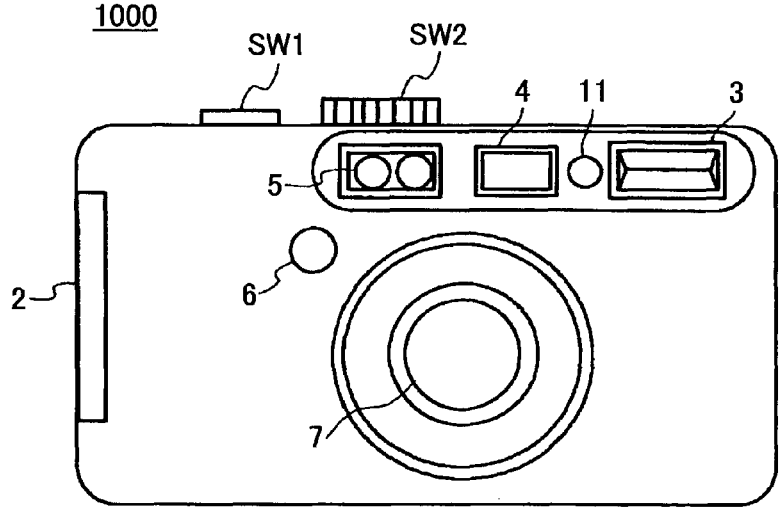
Figure 1C:
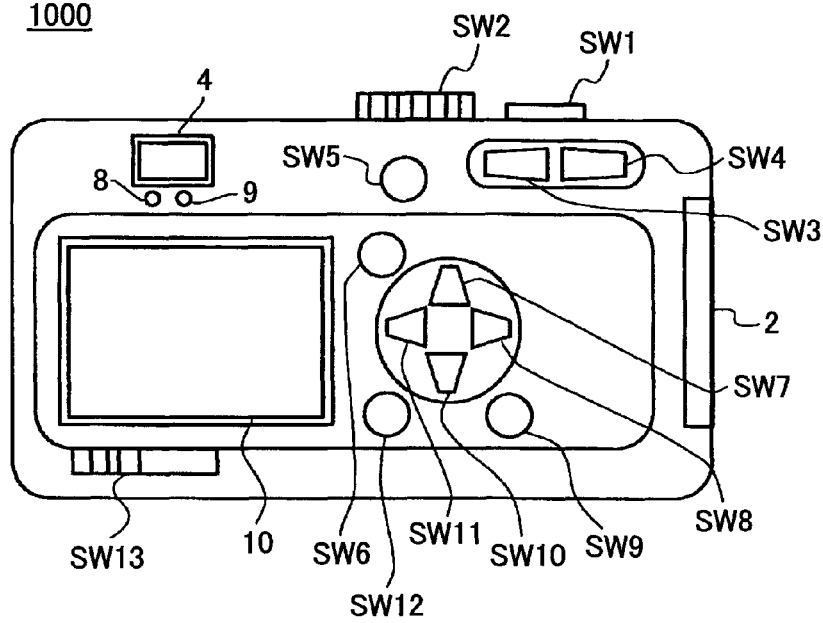

FIGS. 1A, 1B, and 1C are a plan view, a front view, and a rear view of an imaging apparatus (image recording apparatus) 1000 according to an embodiment of the present invention, respectively. In this embodiment of the present invention, the imaging apparatus (image recording apparatus) 1000 is a digital camera. In FIGS. 1A-1C, shutter buttons (switches) SW1 and SW2 are provided on an upper part of the imaging apparatus 1000. Furthermore, a strobe illumination part 3, a finder (viewfinder) 4, a distance measuring unit 5, a remote control light receiving part 6, a camera cone unit 7, and a self LED (Light Emitting Diode) 11 are provided on a front part of the imaging apparatus 1000. A memory card insertion part 2 is provided on a front left side of the imaging apparatus 1000. The finder (viewfinder) 4, the AF (Auto Focus) LED 8, a strobe LED 9, an LCD (Liquid Crystal Display) monitor 10, and various control switches (SW 1-13) are provided on the rear part of the imaging apparatus 1000.

Figure 2:
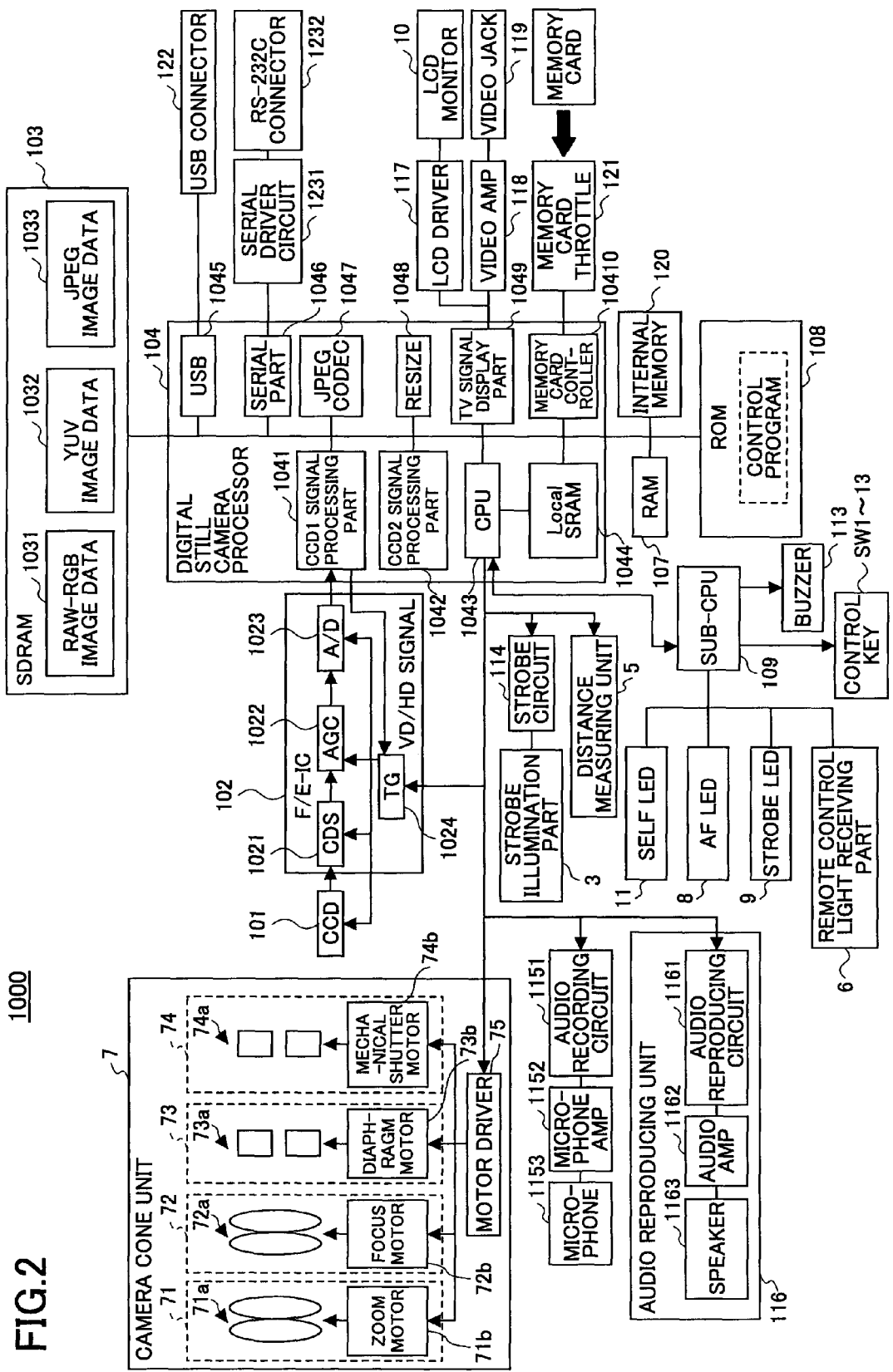
FIG. 2 is a block diagram showing an exemplary configuration of a digital camera (image recording apparatus) according to an embodiment of the present invention.

Next, operation of the digital camera (imaging apparatus) 1000 according to an embodiment of the present invention is described with reference to FIG. 2. FIG. 2 is a block diagram showing an exemplary configuration of the digital camera (imaging apparatus) 1000 according to an embodiment of the present invention.

The camera cone unit 7 comprises a zoom optical system 71, a focus optical system 72, a diaphragm unit 73, a mechanical shutter unit 74, and a motor driver 75. The zoom optical system 71 includes a zoom lens 71a for obtaining optical images of a target object and a zoom driving motor 71b. The focus optical system 72 includes a focus lens 72a and a focus driving motor 72b. The diaphragm unit 73 includes a diaphragm 73a and a diaphragm motor 73b. The mechanical shutter unit 74 includes a mechanical shutter 74a and a mechanical shutter motor 74b. The motor driver 75 is for driving each of the motors 71b, 72b, 73b, 74b included in the camera cone unit 7. The motor driver 75 is controlled according to drive commands from a CPU 1043 inside a digital still camera processor 104 (described below) based on inputs from the remote control light receiving part 6 and control inputs from the control keys SW1-SW13.

The ROM 108 stores, for example, a control program and parameters used for executing various controls (control parameters). The control program and control parameters stored in the ROM 108 are written in a code readable for the CPU 1043 inside the digital still camera processor 104. When the power of the digital camera 1000 is turned on, the control program is loaded into a main memory (not shown). Then, the CPU 1043 controls operations of each part of the digital camera 1000 according to the control program and temporarily stores, for example, data required for executing control in a RAM 107 or a Local SRAM 1044 in the digital still camera processor 104. By using a rewritable flash ROM as the ROM 108, the control program and the control parameters can be changed and version upgrading of functions of the digital camera 1000 can performed easily.

In FIG. 2, a CCD (Charge Coupled Device) 101 is a solid state image sensing device (hereinafter also referred to as "image sensor" or "image sensing part") for performing photoelectric conversion of an optical image. A F/E (Front End)-IC 102 includes a CDS (Correlated Double Sampling) part 1021 for performing correlated double sampling for removing image noise, an AGC (Automatic Gain Control) part 1022 for performing automatic gain control, an A/D (Analog/Digital) part 1023 for performing digital signal conversion, and a TG part 1024 for generating timing signals.

The TG part 1024 receives vertical synchronizing signals (hereinafter referred to as "VD signals") and horizontal synchronizing signals (hereinafter referred to as "HD signals") from a CCD1 signal processing part 1041 and generates timing signals for driving the CCD 101 and the F/E-IC 102 according to the control of the CPU 1043.

The digital still camera processor 104 includes the CCD1 signal processing part 1041 for performing a white balance setting process or a gamma setting process on data input from the CCD 101 and output from the F/E-IC 102 and sending VD signals and HD signals to the TG part 1024; a CCD2 signal processing part 1042 for performing conversion to luminance data/color difference data by performing a filtering process; the CPU 1043 for controlling operations of each part in the digital camera 1000; the Local SRAM 1044 for temporarily storing, for example, data required for executing control; a USB part 1045 for performing USB communications with outside apparatuses (e.g. personal computer); a serial communication part 1046 for performing serial communications with outside apparatuses (e.g. personal computer); a JPEG CODEC part 1047 for performing JPEG compression/decompression; a RESIZE part 1048 for expanding/reducing the size of image data by performing an interpolation process; a TV signal display part 1049 for performing conversion to video signals for displaying image data with an outside display apparatus (e.g. liquid crystal monitor, television); and a memory card controller 10410 for controlling a memory card that records photographed image data.

A SDRAM 103 is for temporarily storing image data when various processes are performed on image data by the digital still camera processor 104. For example, the image data include RAW-RGB image data, YUV image data, and JPEG image data. The RAW-RGB image data are data where a white balancing process and/or a gamma setting process is performed (by the CCD1 signal processing part 1041) on data obtained from the CCD 101 via the F/E-IC 102. The YUV image data are data where a luminance data conversion process and/or a color difference data conversion process is performed (by the CCD2 signal processing part 1042) on data obtained from the CCD 101 via the F/E-IC 102. The JPEG image data are data where a JPEG compression process is performed (by the JPEG CODEC block 1047).

A memory card throttle 121 is for attaching a detachable memory card thereto. An internal memory 120 is for enabling photographed image data to be recorded therein in a case where a memory card is not attached to the memory card throttle 121.

A LCD (Liquid Crystal Display) driver 117 is a drive circuit for driving the LCD monitor 10 (described in detail below). The LCD driver 117 also has a function of converting video signals output from the TV signal display part 1049 to signals for display on the LCD monitor 10. The LCD monitor 10 is used for, for example, monitoring the status of a target object prior to a photographing operation, confirming a photographed image, and displaying image data recorded in the memory card or the internal memory 120.

A video AMP 118 is for performing 75Ω impedance conversion on video signals output from the TV signal display part 1049. A video jack 119 is a jack for connecting to an outside display apparatus (e.g. a TV set).

A USB connector 122 is for performing USB connection with an outside apparatus (e.g. personal computer). A serial driver circuit 1231 is a circuit for performing voltage conversion on signals output from the serial communication part 1046 for performing serial communications with outside apparatuses (e.g. personal computer). A RS-232C connector 1232 is for performing serial connection with an outside apparatus (e.g. personal computer).

A SUB-CPU 109 is a CPU having a ROM/RAM embedded in a single chip. The SUB-CPU 109 is for outputting operation data of the user to the CPU 1043 according to signals output from the control keys (SW1-SW13) and the remote control light receiving part 6. The SUB-CPU 109 is also for receiving signals indicating the status of the camera from the CPU 1043, converting the signals to controls signals for controlling the self LED 11, the AF LED 8, the strobe LED 109, and the buzzer 113, and outputting the control signals to the self LED 11, the AF LED 8, the strobe LED 109, and the buzzer 113.

The self LED 11 is for indicating that a self-timer is in operation when a self-timer function is selected. The AF LED 8 is for indicating the focus status during photography. The strobe LED 9 is for displaying the strobe charge status. The AF LED 8 and the strobe LED 9 may also be used for displaying, for example, access status of the memory card.

The control keys (SW1-SW13) are key circuits operated in correspondence with the controls of the user. The remote control light receiving part 6 is for receiving signals transmitted from a remote control signal transmitter in correspondence with the controls of the user. An audio recording unit 115 includes a microphone 1153 for receiving audio signals input by the user, a microphone AMP 1152 for amplifying the input audio signals, and an audio recording circuit 1153 for recording the amplified audio signals. An audio reproducing unit 116 includes an audio reproducing circuit 1161 for converting recorded signals to audio signals that can be output from a speaker 1163, an audio AMP 1162 for amplifying the converted audio signals and driving the speaker 1163, and a speaker for outputting audio signals.

Figure 3:
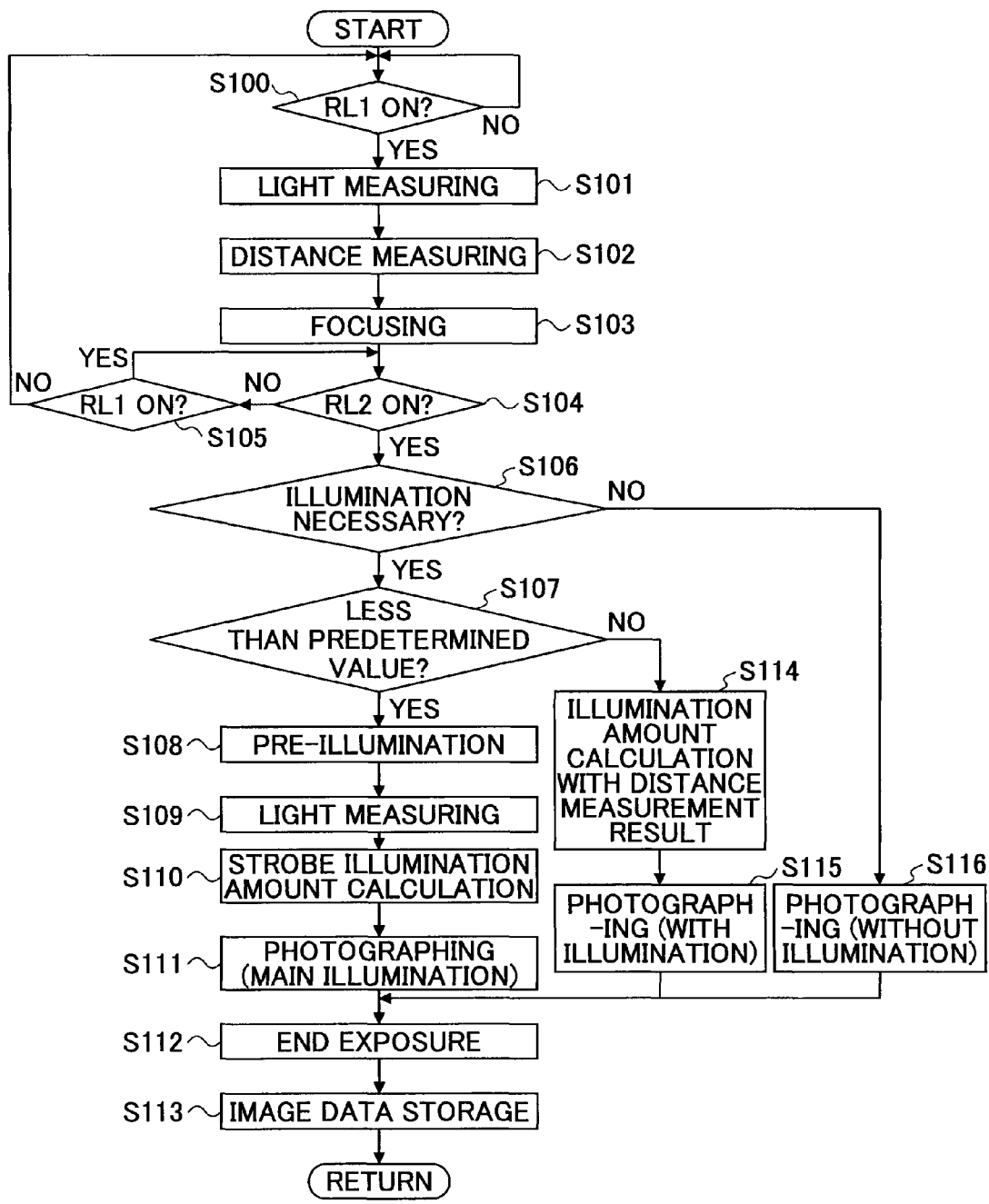
FIG. 3 is a flowchart showing a photographing operation process of a digital camera according to an embodiment of the present invention.

FIG. 3 is a flowchart showing a photographing operation process of a digital camera according to an embodiment of the present invention. In this embodiment of the present invention, the shutter button SW1 is a two-step mechanical switch that outputs a RL1 signal for indicating a first step (halfway depressed) of the shutter button SW1 and a RL2 signals for indicating a second step (fully depressed) of the shutter button SW1.

In a case where the RL1 signal is turned ON (Yes in Step S100), the luminance of the target object is measured (luminance measurement) (Step S101) and distance is measured (distance measurement) (Step S102) based on the output of the image sensor 101, to thereby execute a focusing operation in accordance with the measurement results (Step S103). After the focusing operation is executed, it is determined whether the RL2 signal is turned ON (RL2 signal standby state, Step S104). In a case where the RL1 signal is turned OFF (No in Step S104 and No in Step S105), the photographing operation process returns to its initial state of Step S100 (RL1 signal standby state).

In a case where the RL2 signal is turned ON (Yes in Step S104), it is determined whether illumination during exposure is necessary (Step S106). In the determination according to this embodiment of the present invention, it is determined that illumination is to be necessary when the shutter time defined according to the luminance measured in the RL1 operation (halfway pressing of shutter button), the F number of the photograph lens, and the ISO sensitivity of the image sensor is longer than a critical shutter time for preventing shaking from occurring. In a case where illumination is determined unnecessary (No in Step S106), a photograph of the target object is taken without strobe illumination (Step S116) and the photographed image is recorded (stored) in a memory to thereby complete the photographing operation process (Step S112, Step S113).

In a case where illumination is determined to be necessary (Yes in Step S106), it is determined whether the distance with respect to the target object (target object distance) is greater than a predetermined value (Step S107) based on the distance measured in the RL1 operation (halfway pressing of shutter button). In a case where the target object distance is determined to be greater than the predetermined value (target object distance determined to be further), a photograph of the target object is taken with illumination of the strobe. In this case, the amount of the illumination is determined according to the sensitivity of the image sensor, the F number of the photograph lens, and the distance of the target object (Step S114, Step S115). In a case where the target object distance is determined to be less than the predetermined value (target object distance determined to be nearer), pre-illumination of the strobe is executed (Step S108). Then, the amount of illumination required for executing main illumination (main exposure) of the strobe during a subsequent photographing step is calculated based on a signal output from the image sensor 101 according to the reflected light obtained by the execution of the pre-illumination process (Step S109, Step S110). That is, the difference between the pre-illumination amount and the illumination amount for appropriate exposure is calculated, so that the calculation result can be used for determining the amount of illumination for executing main exposure (photographing). Thereby, the photographing operation is executed with strobe illumination based on the calculated illumination amount (Step S111). The illumination amount of the pre-illumination is determined according to the distance of the target object, the F number of the lens, and the sensitivity of the image sensor.

Figure 4:
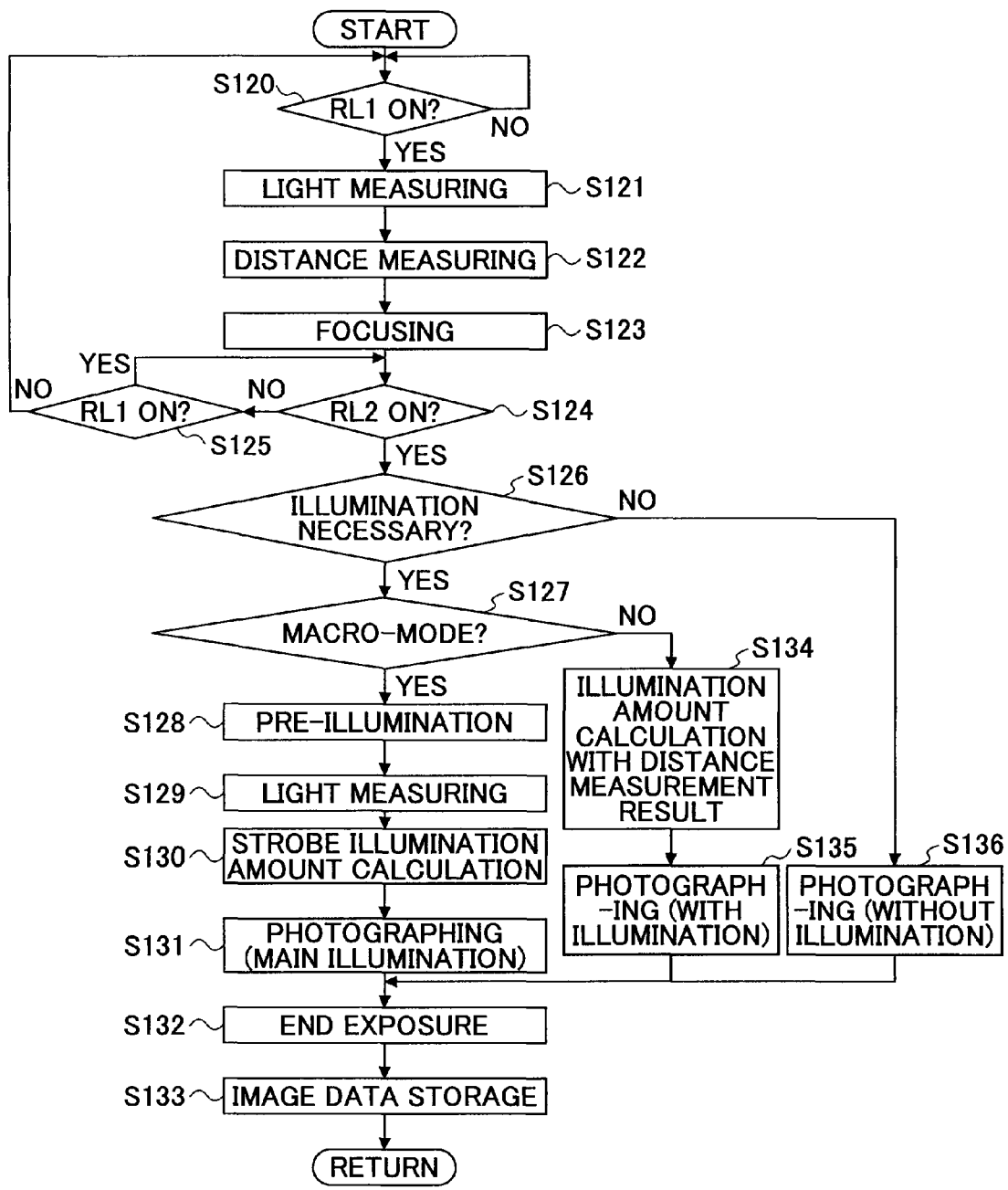
FIG. 4 is a flowchart showing a photographing operation process of a digital camera according to another embodiment of the present invention.

FIG. 4 is a flowchart showing a photographing operation process of a digital camera according to another embodiment of the present invention. The difference between this embodiment of the present invention and the above-described embodiment of the present invention is the criterion for selecting the illumination type of the strobe during a photographing operation. In this embodiment of the present invention, the type of strobe illumination is selected depending on whether a macro-mode is active (Step S127 of FIG. 4) instead of comparing the target object distance with a predetermined value (Step S107 of FIG. 3). That is, in a case where the macro-mode is active (Yes in Step S127), illumination of the strobe is controlled according to a pre-illumination type (Steps S128-131). In a case where the macro-mode is inactive (No in Step S127), illumination of the strobe is controlled according to a flash-matic type (Steps S34-135).

Figure 5:
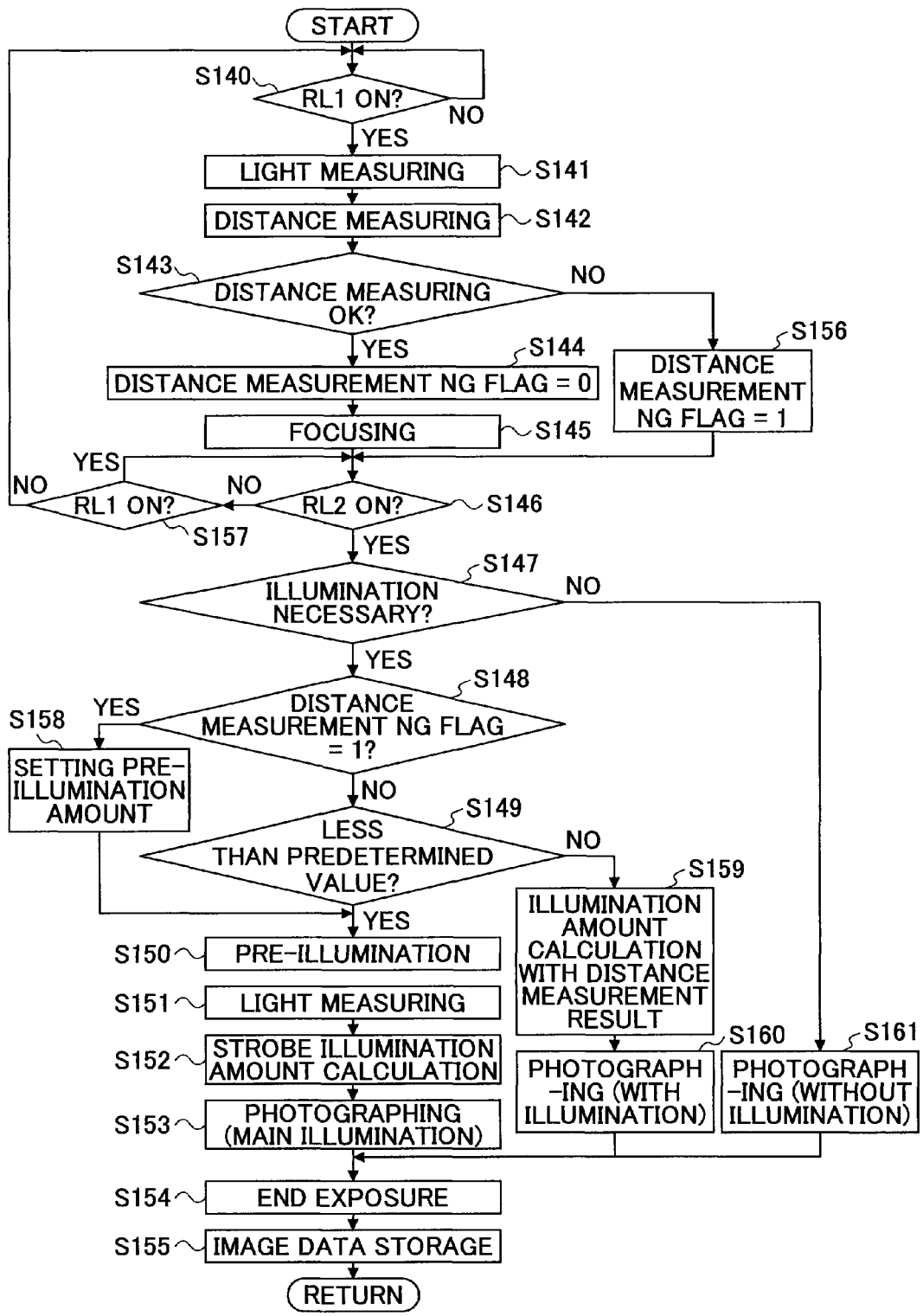
FIG. 5 is a flowchart showing a photographing operation process of a digital camera according to yet another embodiment of the present invention.

FIG. 5 is a flowchart showing a photographing operation process of a digital camera according to yet another embodiment of the present invention. This embodiment of the present invention can be applied to a case where the distance measurement result is unsatisfactory or a case where distance cannot be measured. In FIG. 5, the step of determining whether the RL1 is ON (reception of RL1 signal) (Step S140), the step of measuring luminance (Step S141), and the step of measuring distance (Step S142) are substantially the same as corresponding steps (Steps S100-S102) shown FIG. 3. After the distance measurement of Step S142, in a case where the distance measurement result is satisfactory (OK) (Yes in Step S143), a distance measurement NG flag is set (reset) to "0" (Step S144) and the photographing operation process proceeds to a subsequent focusing operation (Step S145). In a case where the distance measurement result is unsatisfactory (NG) (No in Step S143), the distance measurement NG flag is set to "1" (Step S156) and the photographing operation process stands by for the RL2 signal to be turned On (RL2 signal standby state) (Step S146). In a case where the RL2 signal is turned ON (Yes in Step S146) and illumination is determined to be unnecessary (No in Step S147), a photograph of the target object is taken without strobe illumination (Step S161) and the photographed image is recorded (stored) in a memory to thereby complete the photographing operation process (Step S154, Step S155).

In a case where illumination is determined to be necessary (Yes in Step 147), it is determined whether the distance measurement NG flag is "0" or "1" (Step S148). In a case where the distance measurement NG flag is "0" (distance measurement OK) (No in Step S148), Steps S149-S155, S159, and S160 which correspond to Steps S107-S113, S114 and S115 of FIG. 3 are executed. In a case where the distance measurement NG flag is "1" (distance measurement NG) (Yes in Step S148), a predetermined illumination amount is set as the amount of illumination to be used in a subsequent pre-illumination process (hereinafter also referred to as "pre-illumination amount"). Then, the pre-illumination process (Step S150) and the steps following the pre-illumination process (Steps S151-155) are executed.

Figure 6:
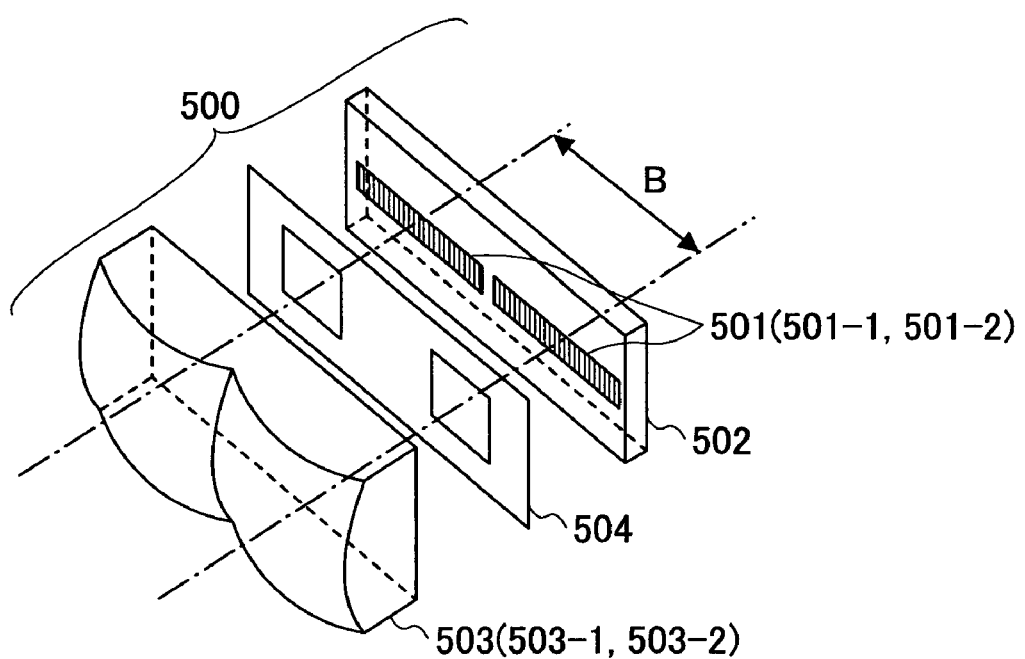
FIG. 6 shows an exemplary configuration of a distance measuring device used in a distance measuring unit according to an embodiment of the present invention.

It is to be noted that a distance measuring part according to an embodiment of the present invention includes both the distance measuring unit 5 and the CCD (image sensor) 101 as shown in FIG. 2. Accordingly, the digital camera 1000 can use either one of the distance measuring unit 5 and the CCD (image sensor) 101 or both the distance measuring unit 5 and the CCD (image sensor) 101 depending on various conditions when taking a photograph (photographing conditions). FIG. 6 shows an exemplary configuration of a distance measuring device 500 used in the distance measuring unit 5 according to an embodiment of the present invention. In this example shown in FIG. 6, the distance measuring unit includes a control unit 502 having a light receiving sensor 501 for receiving incident light from a target object, a lens 503 for imaging (converging) light from the target object, and a diaphragm 504 for restricting the amount of incident light from the light receiving sensors 501. The light receiving sensor 501 includes right and left light receiving sensor parts 501-1, 501-2 which are spaced apart at a predetermined distance B (center distance). The lens 503 includes right and left lens parts 503-1 and 503-2. The right and left light receiving sensor parts 501-1, 501-2 are equally provided with plural light receiving devices arranged in a single row. Furthermore, the control unit 502 includes a program for controlling the storage of light of the light receiving sensor 501 and the reading out of the amount of light received by the light receiving sensor parts 501-1, 501-2.

Figure 7:
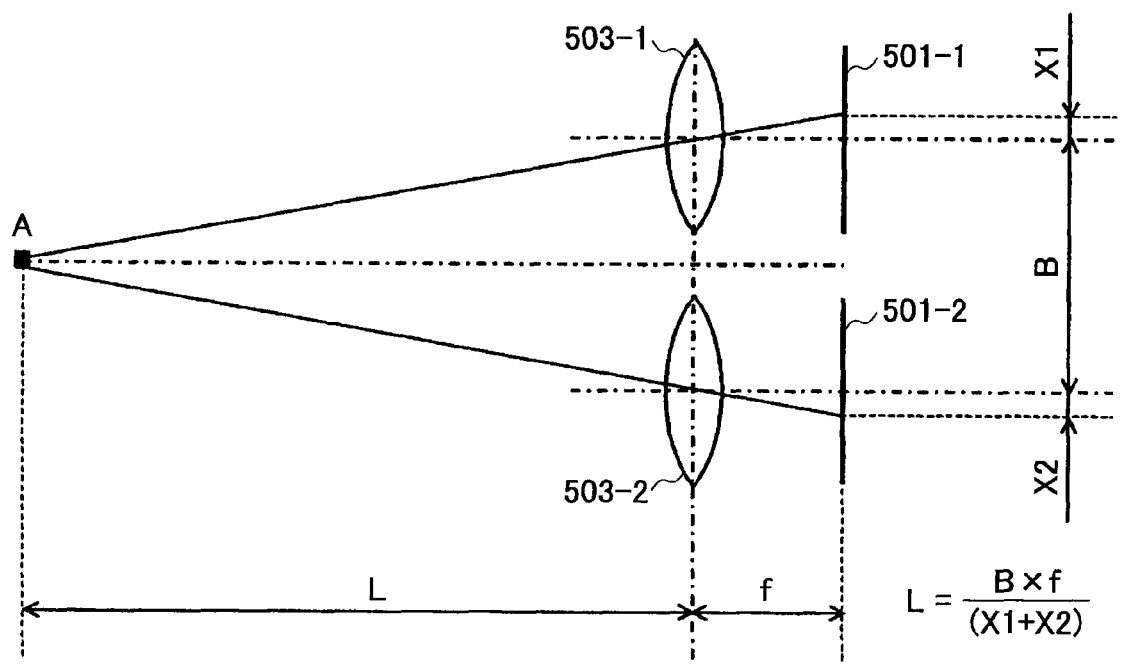
FIG. 7 is a schematic diagram for describing operation of a distance measuring device according to an embodiment of the present invention.

FIG. 7 is a schematic diagram for describing operation of the distance measuring device 500 according to an embodiment of the present invention. In FIG. 7, "L" indicates the distance between a target object A and a center point perpendicularly intersecting the optical axis of the lens 503 of the distance measuring device 500, "f" indicates the distance between the lens 503 (503-1, 503-2) and the light receiving sensor 501 (501-1, 501-2), "B" indicates the center distance between the right light receiving sensor part 501-1 (corresponding to the right lens part 503-1) and the left light receiving sensor part 501-2 (corresponding to the left lens part 503-2), "X1" indicates the amount of deviation between the optical axis of the light incident on the right light receiving sensor part 501-1 and the optical axis of a light parallel with respect to the incident light of the right light receiving sensor part 501-1 (optical axis of light from point of infinity), and "X2" indicates the amount of deviation between the optical axis of the light incident on the left light receiving sensor part 501-2 and the optical axis of a light parallel with respect to the incident light of the left light receiving sensor part 501-2 (optical axis of light from point of infinity). The distance "L" may be calculated by using a triangular distance measuring (ranging) method as shown in the following Formula (1).

$$L = B \times f / (X1 + X2) \quad \text{Formula (1)}$$

Since the values of the distance B between the light receiving sensor parts 501-1, 501-2 and the distance f between the lens 503 and the light receiving sensor 501 are set beforehand by the distance measuring device 500, the CPU 1043 reads out the light reception amount of the light receiving sensor 501 of the distance measuring element 500 and calculates (X1+X2) with the read out light reception amount, and substitutes (X1+X2) to the above-described Formula (1). Thereby, the distance L to the target object A is obtained.

Figure 8:
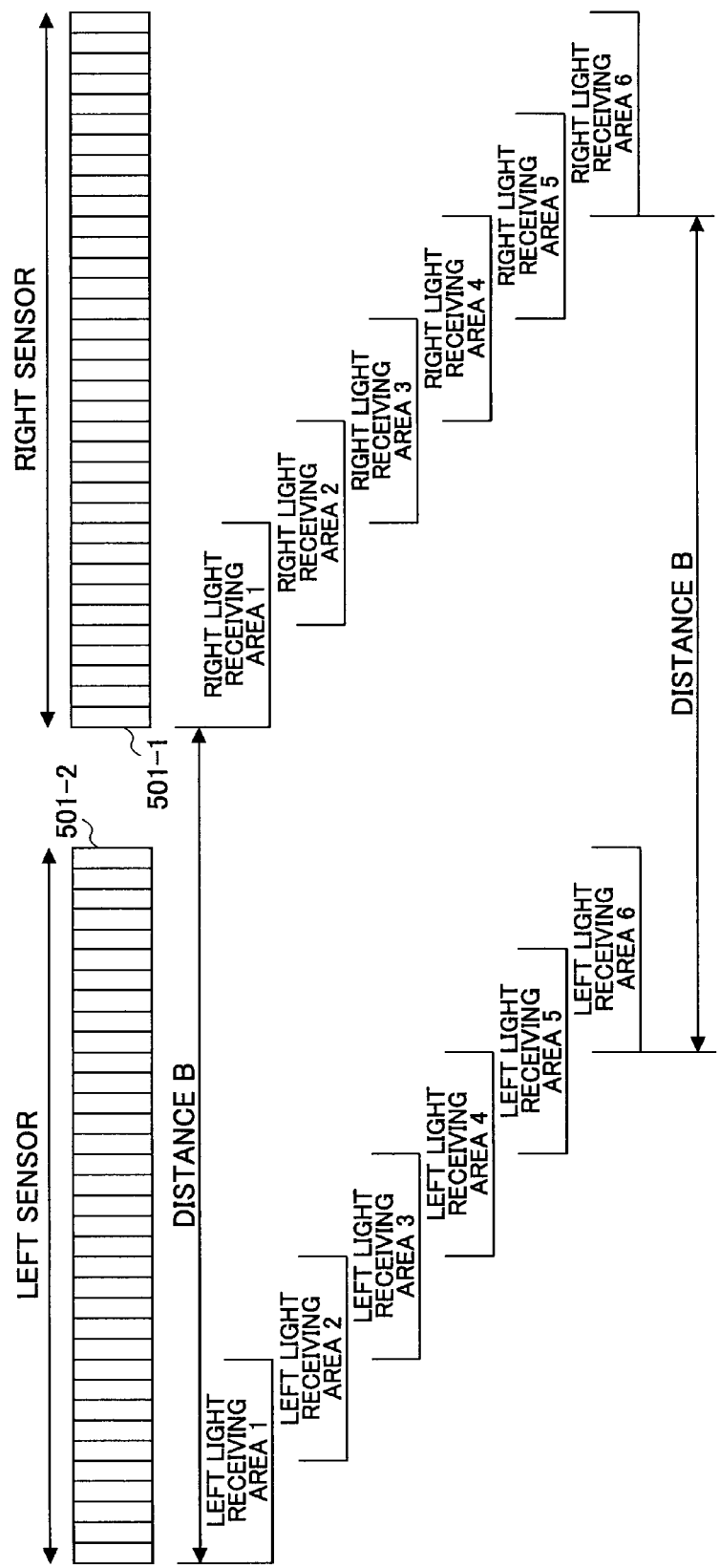
FIG. 8 is a schematic diagram for describing a light receiving area of a light receiving sensor according to an embodiment of the present invention.

FIG. 8 is a schematic diagram for describing a light receiving area of the light receiving sensor 501 according to an embodiment of the present invention. As described above, the light receiving sensor 501 includes right and left light receiving sensor parts 501-1, 501-2 in which the right and left light receiving sensor parts 501-1, 501-2 are provided with equal numbers of plural light receiving devices arranged in a single row. The plural light receiving devices are divided into groups of light receiving devices in which each group corresponds to a single light receiving area. Thereby, the right and left light receiving sensor parts 501-1, 501-2 are partitioned into plural light receiving areas. As shown in FIG. 8, the light receiving devices included in each light receiving area may overlap with other light receiving devices included in other light receiving areas. For example, in a case where 130 light receiving devices are provided in each of the right and left light receiving sensor parts 501-1, 501-2 and each light receiving area comprises 30 light receiving devices, $1^{st}$ to $30^{th}$ light receiving devices starting from the left end of each light receiving sensor part 501-1, 501-2 are included in a first light receiving area 1, $20^{th}$ to $50^{th}$ light receiving devices are included in a second light receiving area 2, $40^{th}$ to $70^{th}$ light receiving devices are included in a third light receiving area 3, $60^{th}$ to $90^{th}$ light receiving devices are included in a fourth light receiving area 4, $80^{th}$ to $110^{th}$ light receiving devices are included in a fifth light receiving area 5, and $90^{th}$ to $130^{th}$ light receiving devices are included in a sixth light receiving area 6. In this example, ten light receiving devices from the left end of each light receiving sensor part 501-1, 501-2 are overlapped. As shown in FIG. 8, since the light receiving sensor parts 501-1, 501-2 are divided into light receiving areas in the same manner, the light receiving areas of the right light receiving sensor part 501-1 correspond to those of the left light receiving sensor part 501-2.

Figure 9:
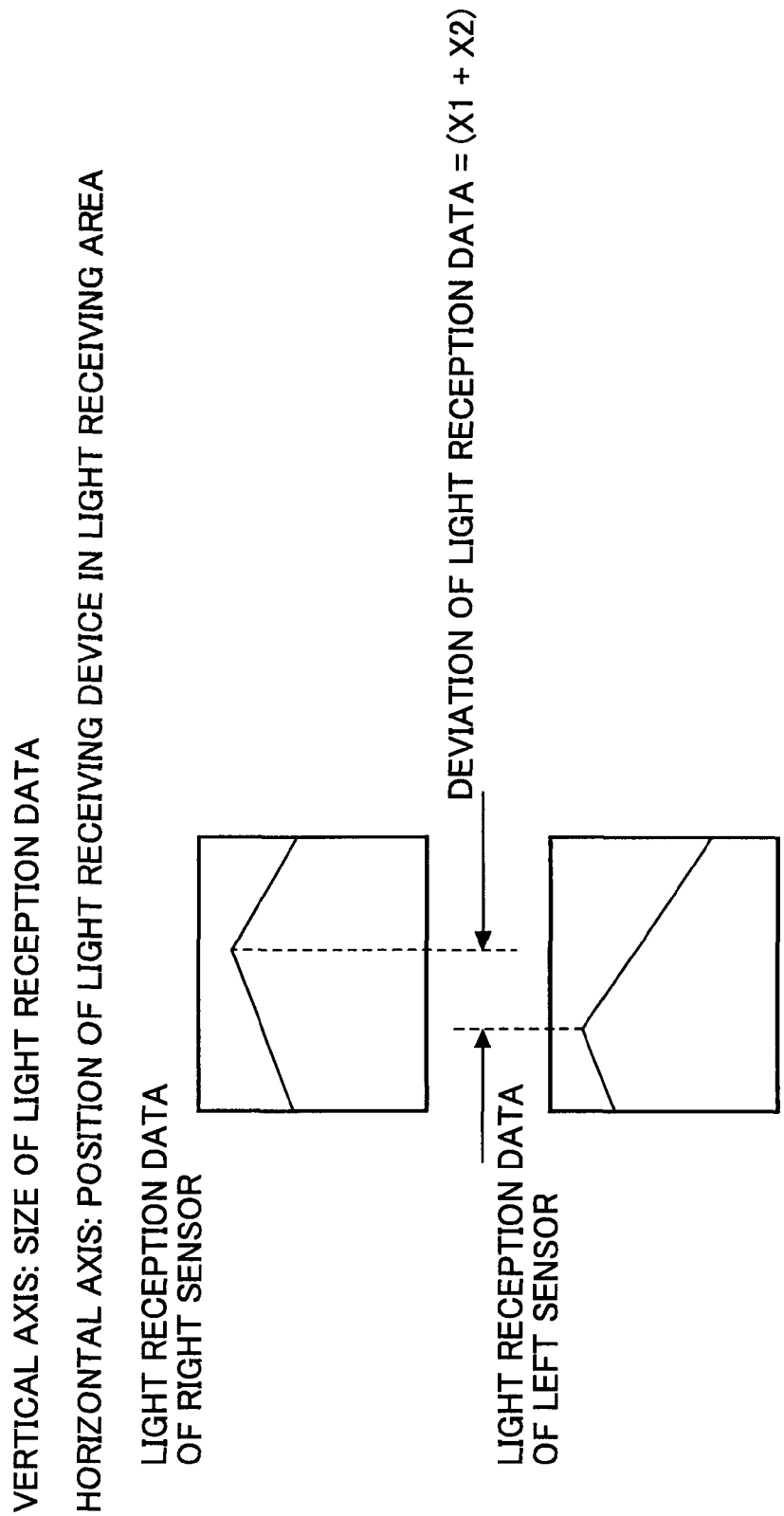
FIG. 9 is a schematic diagram for describing light reception data indicating light received at a light receiving area of light receiving sensor parts according to an embodiment of the present invention.

FIG. 9 is a schematic diagram for describing light reception data indicating light received at a light receiving area of the light receiving sensor parts 501-1, 501-2 according to an embodiment of the present invention. The vertical axis indicates the size (light amount) of the light reception data received by the light receiving devices provided in the light receiving area, and the horizontal axis indicates the position of each light receiving device. In this example, (X1+X2) is obtained by comparing the shapes formed by the light reception data of the light receiving areas of the right and left light receiving sensor parts 501-1, 501-2 and detecting the amount of deviation (difference) between the two shapes of the light reception data.

Figure 10:
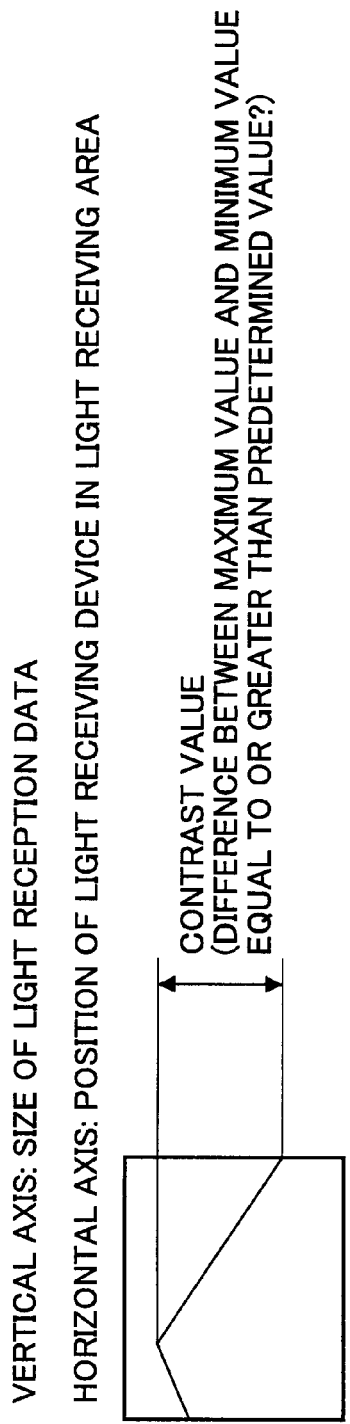
FIG. 10 is a schematic diagram for describing a predetermined contrast value of light reception data indicating light received at the light receiving areas of the light receiving sensor parts according to an embodiment of the present invention.

FIG. 10 is a schematic diagram for describing a predetermined contrast value of light reception data indicating light received at the light receiving areas of the light receiving sensor parts 501-1, 501-2 according to an embodiment of the present invention (In this example, FIG. 10 shows light reception data received at a light receiving area of the light receiving sensor parts 501-1, 501-2). The horizontal and vertical axes are the same as those of FIG. 9. It is determined whether the difference between the maximum value of light reception data and the minimum value of light reception data of each light receiving sensor part 501-1, 501-2 is equal to or greater than a predetermined value. In a case where the difference between the maximum value of light reception data and the minimum value of light reception data of one of the light receiving sensor parts 501-1, 501-2 is less than the predetermined value, it is determined that contrast is unsatisfactory (NG). It is determined that contrast is satisfactory where the difference between the maximum value of light reception data and the minimum value of light reception data of both light receiving sensor parts 501-1, 501-2 is equal to or greater than the predetermined value.

Figure 11:
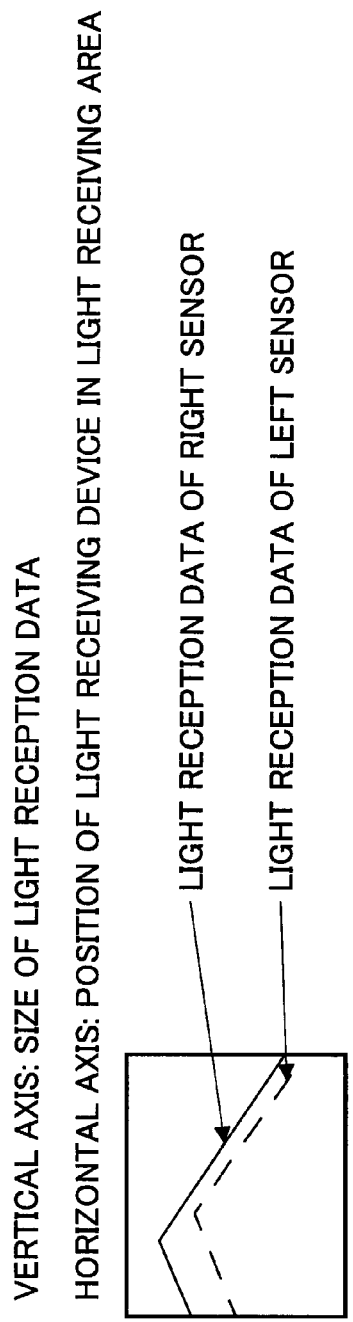
FIG. 11 is a schematic diagram for describing the difference of light reception data of the right and left light receiving sensor parts according to an embodiment of the present invention.

FIG. 11 is a schematic diagram for describing the difference of light reception data of the right and left light receiving sensor parts 501-1, 501-2 according to an embodiment of the present invention. The horizontal and vertical axes are the same as those of FIG. 9. Although it is desired that the shapes of the light reception data of the left and right light receiving sensor parts 501-1, 501-2 be the same with respect to the vertical axis, there are cases where the shapes are different due to light conditions of the target object (thus resulting in a difference between a right side image and a left side image). Accordingly, the difference between a right side image and a left side image (right/left image difference) is determined by comparing the total light reception amount of the light receiving devices included in a light receiving area of the left and right light receiving sensor parts 501-1, 501-2.

In FIG. 11, the solid line indicates the total light reception amount of the right light receiving sensor part 501-1 and the broken line indicates the total light reception amount of the left light receiving sensor part 501-2. Thus, the area surrounded by the solid line and the broken line indicates the difference of the total light reception amount between the right light receiving sensor part 501-1 and the left light receiving sensor part 501-2. In a case where the value of the surrounded area is equal to or greater than a predetermined value, it is determined that the right/left image difference is unsatisfactory.

Figure 12:
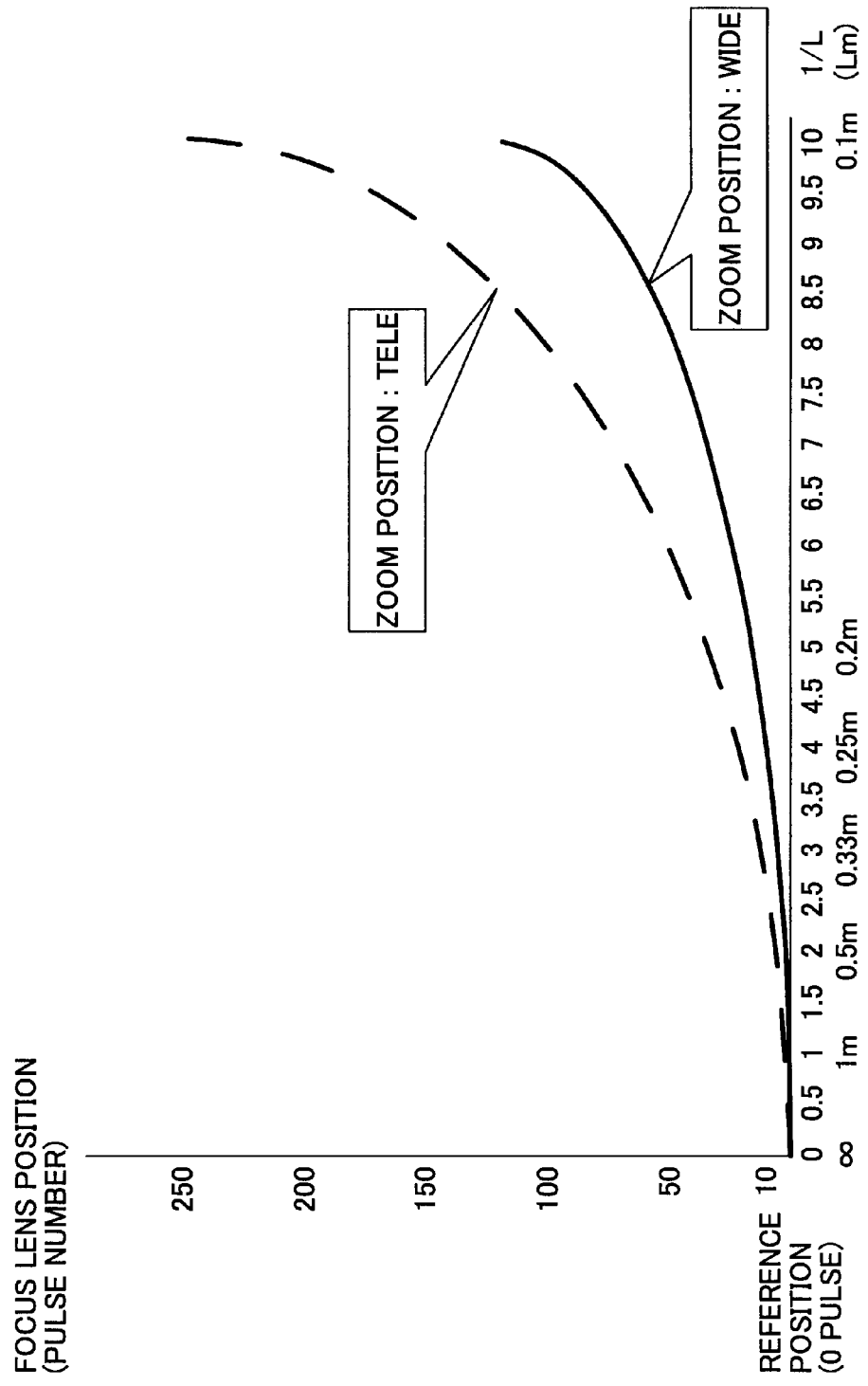
FIG. 12 is a diagram showing a relationship between a reciprocal number of the focus distance (1/L) and the focus lens position number (pulse number) according to an embodiment of the present invention.

Next, methods of calculating the distance from a target object according to the position of the focus lens 72a when the focus lens 72a is in a focused state are described. The focus lens 72a may be set to the focus state by calculating and evaluating signals output from the CCD (image sensor) 101 in correspondence with the driving of the focus lens 72a. As one example for calculating the distance according to the position of the focus lens 72a, a formula may be used based on the relationship between a reciprocal number of the focus distance (1/L) and the focus lens position number (pulse number) as shown in FIG. 12. As another example for calculating the distance according to the position of the focus lens 72a, a calculation table indicative of the relationship between a reciprocal number of the focus distance (1/L) and the focus lens position number (pulse number) may be stored in the ROM 108 and referred to. In order to obtain the current focus lens position where, for example, the focus lens 72a is driven by a pulse motor (not shown), a reference position (reference point) may be detected by conducting a resetting movement of the focus lens 72a upon activation of the digital camera 1000 and then counting the number of pulses obtained by moving the focus lens 72a from the reference position to the current position.

With the above-described distance measuring part, whether the measurement result is OK (satisfactory) or NG (unsatisfactory), that is, whether the measurement result is reliable (high reliability) or unreliable (low reliability) may be determined depending on whether a calculated value (evaluated value) is within a predetermined range.

Accordingly, in a case where the distance measurement result is unsatisfactory (NG), the pre-illumination amount (see flowchart of FIG. 5) is set by using the measurement result obtained by the distance measuring part with consideration of other conditions such as the F number of the lens or the sensitivity of the image sensor 101.

Furthermore, in a case where distance measurement cannot be performed, the pre-illumination amount may be set in a manner described below.

In the following example, the photograph distance range for enabling exposure to be appropriately controlled during an actual photographing operation (main exposure, main illumination) based on the F number of the lens and the sensitivity of the image sensor 101 (hereinafter also referred to as "permissible photograph distance range") is 0.25 m to 4 m. The range of the illumination amount required for the permissible photograph distance range is 8 EV (Exposure Value, $2^{8=256}$ times) where the dynamic range with respect to the brightness of the image sensor 101 is 4 EV ($2^4$=16). The illumination amount required for attaining appropriate exposure is proportional to distance to the second power. Accordingly, in setting the pre-illumination amount, illumination measurement with an error of ±2 can be achieved by setting illumination amount to a value enabling an appropriate exposure to be attained with respect to a medium distance (1 m) of the range 8 EV. Thus, the illumination amount required for main exposure can be calculated with respect to a target object situated at a distance ranging from 0.5 m to 2 m. Furthermore, since a photograph is taken based on the calculated illumination amount, an image with satisfactory exposure can be obtained with respect to a target object situated at a distance ranging from 0.5 m to 2 m. Furthermore, in a case where light measurement cannot be executed due to overexposure during the pre-illumination process (in a case where the distance with respect to the target object is no greater than 0.5 m), an image of the target object can be recorded having an error within a range of ±1 EV with respect to a target object situated at a distance ranging from 0.25 m to 0.5 m by setting the illumination amount of the main exposure to a value enabling an appropriate illumination amount to be attained for a target object situated at a distance of 0.35 m.

Likewise, in a case where light measurement cannot be executed due to underexposure during the pre-illumination process (in a case where the distance with respect to the target object is no less than 2 m), an image of the target object can be recorded having an error within a range of ±1 EV with respect to a target object situated at a distance ranging from 2 m to 4 m by setting the illumination amount of the main exposure to a value enabling an appropriate illumination amount to be attained for a target object situated at a distance of 2.8 m. It is to be noted that the illumination amount used in the pre-illumination (pre-illumination amount) is desired to be as little as possible for maintaining sufficient illumination energy to be used in the main exposure. Accordingly, as for the conditions in measuring light of the pre-illumination process, it is desired that the F number of the lens be small and the sensitivity of the image sensor 101 be high.

With the above-described imaging apparatus (image recording apparatus) using a relatively inexpensive simple-structured illumination apparatus, a satisfactory exposure can be attained when photographing close distance and far distance target objects with strobe illumination. Furthermore, even in a case where the distance measurement result of the distance measuring part is unsatisfactory (low reliability) or where distance cannot be measured, generation of unsatisfactory images (overexposed images, underexposed images) can be prevented in the permissible photograph distance range (range of the distance in which photographs can be taken).

It is to be noted that the processes (steps) shown in the flowcharts of FIGS. 3-5 may be executed as a program by the CPU 1043. The program may be recorded in a recording medium such as a semiconductor storage part, an optical storage part, and/or a magnetic storage part. The program or the recording medium on which the program is recorded may be used in other systems and apparatuses having configurations different from that of the imaging apparatus (image recording apparatus) according to the above-described embodiment of the present invention for allowing its CPU to execute the program and attain substantially the same advantages of the present invention.

Further, the present invention is not limited to these embodiments, but various variations and modifications may be made without departing from the scope of the present invention.

The present application is based on Japanese Priority Application No. 2006-067985 filed on Mar. 13, 2006, with the Japanese Patent Office, the entire contents of which are hereby incorporated by reference.

What is claimed is:

1. An image recording apparatus comprising:
   an image sensing part for converting an optical image imaged by a photograph lens to an electric signal;
   a distance measuring part for measuring a distance between a target object and the image recording apparatus;
   an illumination part for generating an illumination light and a pre-illumination light;
   a first illumination controlling part for controlling the amount of the illumination light of the illumination part based on the measured distance of the distance measuring part and a F number of the photograph lens;
a second illumination controlling part for controlling the amount of the illumination light of the illumination part based on the electric signal output from the image sensing part in correspondence with the pre-illumination light; and
a selecting part for selecting one of the first illumination controlling part and the second illumination controlling part,
wherein the selecting part selects the first illumination controlling part when the measured distance is greater than a predetermined distance and selects the second illumination controlling part when the measured distance is less than a predetermined distance.

2. The image recording apparatus as claimed in claim 1, wherein the selecting part selects the second illumination controlling part when the distance measuring part cannot satisfactorily measure distance.

3. An image recording apparatus comprising:
an image sensing part for converting an optical image imaged by a photograph lens to an electric signal;
a distance measuring part for measuring a distance between a target object and the image recording apparatus;
an illumination part for generating an illumination light and a pre-illumination light;
a first illumination controlling part for controlling the amount of the illumination light of the illumination part based on the measured distance of the distance measuring part and a F number of the photograph lens;
a second illumination controlling part for controlling the amount of the illumination light of the illumination part based on the electric signal output from the image sensing part in correspondence with the pre-illumination light;
a selecting part for selecting one of the first illumination controlling part and the second illumination controlling part; and
a macro-mode setting part for setting a macro-mode having a photographing range less than a predetermined distance;
wherein the selecting part selects the second illumination controlling part when a macro-mode is selected.

4. An image recording method comprising the steps of:
a) converting an optical image imaged by a photograph lens to an electric signal;
b) measuring a distance between a target object and an image recording apparatus;
c) generating an illumination light and a pre-illumination light;
d) controlling the amount of the illumination light based on the distance measured in step b) and a F number of the photograph lens;
e) controlling the amount of the illumination light based on the electric signal output in step a) in correspondence with the pre-illumination light; and
f) selecting one of step d) and step e),
wherein step d) is selected when the measured distance is greater than a predetermined distance and step e) is selected when the measured distance is less than a predetermined distance.

5. The image recording method as claimed in claim 4, wherein step e) is selected when the distance cannot be satisfactorily measured.

6. An image recording method comprising the steps of:
a) converting an optical image imaged by a photograph lens to an electric signal;
b) measuring a distance between a target object and an image recording apparatus;
c) generating an illumination light and a pre-illumination light;
d) controlling the amount of the illumination light based on the distance measured in step b) and a F number of the photograph lens;
e) controlling the amount of the illumination light based on the electric signal output in step a) in correspondence with the pre-illumination light;
f) selecting one of step d) and step e); and
g) setting a macro-mode having a photographing range less than a predetermined distance;
wherein step e) is selected when a macro-mode is selected.

7. A non-transitory computer-readable recording medium on which a program for causing a computer to execute an image recording method is recorded, the image recording method comprising the steps of:
a) converting an optical image imaged by a photograph lens to an electric signal;
b) measuring a distance between a target object and an image recording apparatus;
c) generating an illumination light and a pre-illumination light;
d) controlling the amount of the illumination light based on the distance measured in step b) and a F number of the photograph lens;
e) controlling the amount of the illumination light based on the electric signal output in step a) in correspondence with the pre-illumination light; and
f) selecting one of step d) and step e),
wherein step d) is selected when the measured distance is greater than a predetermined distance and step e) is selected when the measured distance is less than a predetermined distance.

8. The non-transitory computer-readable recording medium as claimed in claim 7, wherein step e) is selected when the distance cannot be satisfactorily measured.

9. A non-transitory computer-readable recording medium on which a program for causing a computer to execute an image recording method is recorded, the image recording method comprising the steps of:
a) converting an optical image imaged by a photograph lens to an electric signal;
b) measuring a distance between a target object and an image recording apparatus;
c) generating an illumination light and a pre-illumination light;
d) controlling the amount of the illumination light based on the distance measured in step b) and a F number of the photograph lens;
e) controlling the amount of the illumination light based on the electric signal output in step a) in correspondence with the pre-illumination light;
f) selecting one of step d) and step e); and
g) setting a macro-mode having a photographing range less than a predetermined distance;
wherein step e) is selected when a macro-mode is selected.

* * * * *